Patented Apr. 29, 1947

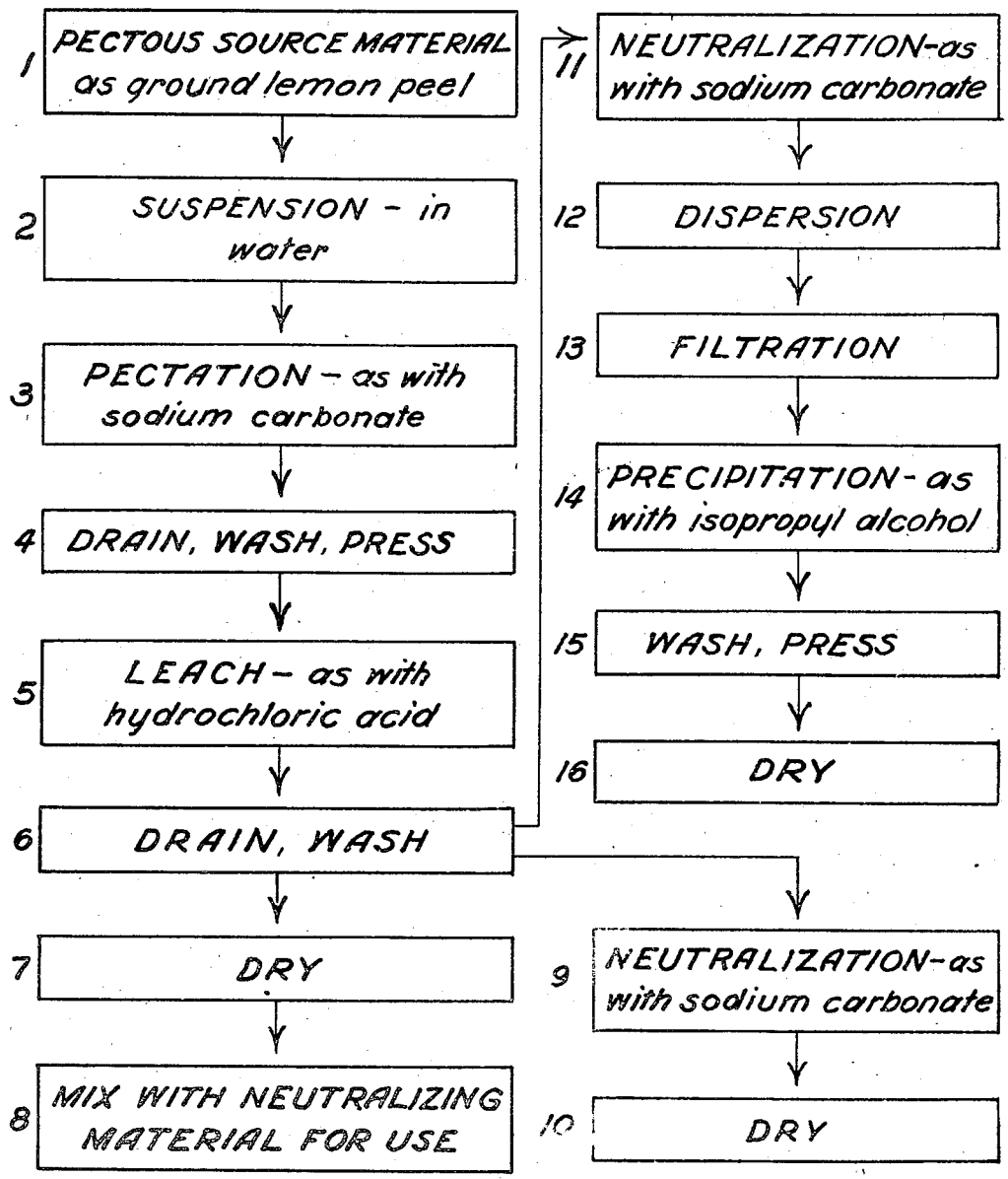

2,419,883

UNITED STATES PATENT OFFICE 2,419,883

PECTIC SUBSTANCES AND METHODS FOR THEIR PREPARATION

Edwin F. Bryant, Corona, Calif., assignor to California Fruit Growers Exchange, Los Angeles, Calif., a corporation of California Application June 27, 1944, Serial No. 542,405

7 Claims. (Cl. 260—209.5)

This invention relates to processes for the production of pectic substances and particularly to salts or esters of pectic substances which are characterized by what has been called their "fibrous" nature. More particularly this invention relates to the preparation of crude "fibrous" pectated pulps which are characterized by the new and highly desirable property of being readily dispersible in water at room temperature to yield aqueous sols of relatively high viscosity.

The present invention involves a special mode of treating pectous source materials to produce the above-mentioned pectic substances. The invention briefly stated, comprises subjecting pectous source material to pectation and then separating from the pectated material various constituents by selective treatment. One of the products of this invention comprises a new crude fibrous pectated pulp, which may be used as a starting material for the preparation of various pectic substances, including purified fibrous pectic acid and the salts thereof.

The term "fibrous" as used by other investigators and as used herein, refers to the characteristic appearance of the alcohol precipitate of the pectic substances extracted from the pectated source material, which precipitate is stringy or fiber-like in appearance. The term "fibrous" is not used to imply that such so-called fibrous pectic substances are composed of actual fibers.

The term "pectation" as used herein refers to the preparation directly from the naturally esterified pectic substances of a salt and/or ester of pectic acid, commonly called a "pectate." This is distinguished from the conventional conversion of pectic materials, first to pectin and then to the pectic acid compound. Pectation may be effected by alkaline reagents, by pectic enzymes or by some combination of both.

It is an object, therefore, of this invention to disclose methods and means for the production of a new, readily "cold water" soluble, crude, fibrous pectated pulp as well as fibrous pectic acid pulp and the salts thereof.

A further object of this invention is to provide and disclose methods and means of improving the heretofore known methods for the production of fibrous pectic substances.

These and further objects and advantages will be clearly apparent from the description of the process and products embodied in the specification and will present themselves to those skilled in the art in the contemplation and use of this invention.

The drawing is a flow sheet illustrating a preferred form of the process, with modifications.

In the example to follow I propose to use citrus fruits as the starting material for the production of the above-mentioned pectic substances.

Lemons are first preferably treated to remove the juice therefrom, by any of the well-known means, as by reaming the juice from the halved fruit, or by passing the whole fruit through a pulping machine or press. Where the juice has been removed from the whole fruit by reaming, the peel will be in relatively large pieces and this peel should now preferably be disintegrated to such an extent as to be of relatively uniformly small particle size, so as to promote ready access of the pectating reagent. I have found that the lemon peel may be satisfactorily disintegrated by passing it through a press of the expressing screw or food grinder variety in which the face plate has openings of about 3/16 inch in diameter. This produces a satisfactory pectous source material which is indicated at 1 on the flow sheet. The ground peel is then suspended in about 2 volumes of water, indicated at 2, and to the suspension there is added a sufficient amount of the pectating reagent sodium carbonate, indicated at 3, to raise the pH of the pulp suspension to about pH 9 when the suspension is in equilibrium. Since a portion of the sodium carbonate will be neutralized by any acid present, the particular amounts of sodium carbonate to be added will vary depending upon the acidity of the suspended mass being treated. The pH of the suspension may be suitably controlled by adding enough sodium carbonate to maintain the suspension alkaline, that is just red, to phenophthalein. Ordinarily the pectation is complete at the above pH within a relatively short time, as, for example, 30 to 60 minutes, when carried on at seasonable temperatures of, say, 20° C. to 30° C., and in the manner and with the source material indicated.

After the suspension has been in equilibrium at the desired pH of operation for the desired period of time, the pulp is drained and preferably pressed and thoroughly washed with water, as indicated at 4. The pulp, which is now referred to as "pectated pulp," is then leached with hydrochloric acid, indicated at 5. To effect the leaching, the pulp is suspended in two volumes of water to which there is added one liter of concentrated hydrochloric acid (average concentration 36 percent hydrochloric acid) for each ten kilograms of the pectated pulp. The suspension is maintained in contact with the acid leach for about one hour during which time it is stirred at frequent intervals, or continuously, if desired. The acid treatment or leaching of the pectated pulp at this step should be adequate to solubilize a substantial portion of the calcium, magnesium, and metallic ions which are capable of and tend to form insoluble pectates. The leached pulp is now drained and washed with water, as indicated at 6, to remove the excess of the acidic reagent, as well as other components which have been solubilized by the acid treatment. The resulting product which is referred to as "fibrous pectic acid pulp" may now be dried as indicated at 7. It is pointed out that it is commercially advantageous to dry the product at this point and then prior to sale or use the dried fibrous pectic acid pulp may be mixed with a neutralizing material, as indicated at 8.

As a modification of the above-mentioned process, the drained and washed pulp, indicated at 6, is neutralized with a suitable reagent such as sodium carbonate, indicated at 9. To effect this neutralization, the sodium carbonate is mixed with the fibrous pectic acid pulp, preferably as a powder in an amount sufficient to adjust the pH of the pulp when at equilibrium to neutrality or to within the range of about pH 6 to 8, as indicated at step 9. The mixing is effectively accomplished by passing the pulp through a cut-flight screw conveyor at which time the powdered sodium carbonate is sprinkled over the fibrous pectic acid pulp. The neutralized pulp may now be dried, as indicated at 10, by use of a drum drier.

When it is desired to separate the pectic substances from the fibrous pectic acid pulp which contains the pectic substances in association with cellulose, the washed pulp from step 6 is suspended in about 2 volumes of water to which there has been added sufficient sodium hydroxide to neutralize the material, indicated at 11, and enough additional to maintain the alkalinity of the suspension just red to phenolphthalein. The suspension is thoroughly stirred for about one hour at room temperature to effect dispersion or solubilization of the sodium pectate, indicated at 12. The dispersion is now filtered, step 13, and the filtrate added to an equal volume of at least 70 percent isopropyl alcohol to effect the precipitation, indicated at 14, of the sodium pectate. The precipitated pectate is then washed with alcohol and pressed, step 15, and the pressed precipitate dried in the usual manner, as indicated at 16.

A further specific example of the manner in which my invention may be carried out is given hereinbelow.

One hundred kilograms of fresh, rather finely ground lemon peel, step 1, is suspended in 400 liters of water, indicated at 2. To this suspension there is added, with stirring, sodium carbonate in an amount sufficient to maintain the suspension red to phenolphthalein when in equilibrium, step 3. Ordinarily about 3.5 kilograms of sodium carbonate will be sufficient to maintain the alkalinity of the suspension at about pH 9. Further amounts of a sodium carbonate solution may be added from time to time to insure the maintenance of the desired pH. It is obvious that the amount of sodium carbonate required will depend to a considerable extent upon the acidity of the pulp suspension being treated, more acid pulps requiring more sodium carbonate and conversely. After equilibrium has been established at the desired pH, the suspension is continuously stirred for a matter of about an hour to insure satisfactory pectation. The temperature of the suspension during pectation may be maintained conveniently at about 25° C. to 30° C., although elevated temperatures may be used if desired and convenient.

At the end of the treating time, any free liquor is drained from the pectated pulp and the pulp thoroughly washed with water and allowed to drain, step 4. Washing of the pulp at this stage may be conveniently effected by passing the pulp through a revolving, cylindrical screen, somewhat inclined from a horizontal position. During the passage of the pulp over the first portion of the screen, it may be sprayed with water which will satisfactorily drain away as the pulp passes over the remainder of the screen.

The pectated pulp is then suspended in about 400 liters of water to which hydrochloric acid has been added, indicated at 5. Sufficient acid is used at this step to solubilize a substantial portion of the calcium present in association with the pectated pulp. Under average operating conditions and when the water used for the suspension is not too hard, about 10 liters of concentrated hydrochloric acid (36%) are sufficient to solubilize the calcium, magnesium, and other substances, so that they may be subsequently removed from association with the pulp. It is to be understood that this leaching of the pectated pulp with an acidic reagent, such as hydrochloric acid, converts the pectic substances existing as pectates to fibrous pectic acid. The pulp is allowed to remain in contact with the acid leach for a time sufficient to solubilize the above-mentioned calcium, etc. Ordinarily when operating at room temperature, a leaching time of from one-half to one hour seems to give satisfactory results. The leached pulp is then drained and again thoroughly washed with water, step 6. It may now be dried, step 7, or subjected to a conversion to the desired salt or ester of pectic acid in a manner similar to that previously described.

It is obvious that many modifications of the above process will readily occur to those skilled in this art. Also, due to the interrelationship of the several variables in the process as, for example, the temperatures at which the various treatments are carried on, the length of time of the treatments, and the pH at which the treatments are effected, as well as the condition of the source material being treated, and the mechanical means used in the process, many modifications are indicated. As a general rule, the variables of temperature, time of treatment, and pH during pectation, are interrelated so that if the time of treatment be extended, the temperature and pH of operation may approach the lower limits of the ranges hereinafter disclosed. Also when the pH at which the pectation is effected approaches the upper limits of the range, the time of treatment is shortened and the temperature of the material being treated may be lower, and when the temperature of the pulp is increased above seasonable temperatures, the time of treatment is shortened, and the pectation may be effected at pH values approaching the lower limits of the range.

While in the specific examples set forth above lemons have been taken as the source material, at step 1, other citrus fruits, as for example, oranges and grapefruit, may be used satisfactorily. Also various other fruits and vegetables as, for example, apples, grapes, quinces, sugar beets, carrots, etc., and such plant materials as agave and sanseviera, etc., which contain appreciable amounts of pectous substances may be used. It is to be noted that while the just mentioned pectous source materials clearly come within the scope of this invention, the process seems to be employed most advantageously with those source materials which are rich in protopectin, and which have not been treated to inactivate the naturally occurring pectic enzymes, although by suitable modification hereinafter disclosed, the processes are applicable with pectic source materials having little or no active pectic enzymes present.

In step 2 the amount of water used for suspending the pectous source material is not critical. Enough water should be used, depending upon the condition of the pulp, to give a handleable suspension and one in which the pectating reagent will have ready access to the pulp particles. Obviously the pulp suspension should be fluid enough to permit thorough stirring without unduly prolonging the treatment.

In step 3, the pectation may be effected not only by the use of sodium carbonate, but sodium hydroxide, ammonium hydroxide, trisodium phosphate, and the pyrophosphates may be used. Ordinarily I do not choose to use alkaline earth compounds for pectation, that is, the compounds of calcium, barium, etc., since these would merely introduce substances which would need to be subsequently removed by the acid leaching or otherwise.

Furthermore, the pH at which the pectation is effected depends not only on the temperature of the pulp being pectated and the time of treatment as set forth hereinbefore, but also upon whether or not active pectic enzymes are present in the source material. Particularly, when active pectic enzymes are not present or are present in only very limited concentration, it is desirable to pectate at a pH range of from about 7 to 12, or perhaps even higher under carefully controlled conditions of time and temperature, while when active pectic enzymes are present, the pectation may be effected by adjusting the pH of the pulp suspension to above about pH 7 but preferably in the neighborhood of about pH 7 to 9. This does not mean, of course, that one is precluded from pectating at the higher pH range of from 7 to 12 when pectic enzymes are present, but merely indicates that such is not necessary to obtain satisfactory results.

The temperature range within which pectation may be satisfactorily effected may encompass the seasonable temperatures of 20° to 30° C. and up to 50° C. It seems that the yield of fibrous pectates diminishes as the temperature of pectation approaches and exceeds about 50° C. For this reason, I prefer to operate the process at the lower end of the temperature range.

The draining, pressing, and washing, set forth at step 4, should be reasonably thorough and may, of course, be performed in many ways and by the use of various types of apparatus, all as is well-known in this art. While it has been indicated in the specific examples that pressing of the pulp is desirable at this stage, it is obvious that pressing may be omitted if pressing facilities are not available and if a thorough job of washing is accomplished.

In leaching the pulp, as indicated in step 5, acids other than hydrochloric acid previously mentioned may be used, for example, nitric acid and acetic acid are indicative of the field and will suggest the many possibilities. It is desired to use an acidic reagent which will be effective in combining with the alkaline earth metals and those other metallic ions of the pulp which tend to form insoluble pectates and such acids should form water-soluble salts of these metallic ions so that they may be readily removed by washing. The amount of acid used will vary in accordance with the source material being treated and the equipment and technique employed.

In step 6 the draining and washing of the pulp may be accomplished as in step 4, and with the same type of apparatus. Pressing the leached pulp at this point seems to be desirable if the pulp is to be subsequently dried.

The drying, indicated at step 7, may, of course, be carried out in any of the well-known manners, care being taken to prevent scorching or charring of the pulp on the one hand and inadequate drying on the other hand.

In step 8 the dried pulp is mixed with a suitable neutralizing material. Sodium carbonate, sodium or ammonium hydroxide, triethanolamine, or any other desired alkaline reagent may be mixed with the pulp. Various alkaloids may also be mixed with the pulp, as, for example, nicotine. These alkaline materials are mixed with the pulp in sufficient amounts so that when the mixture is subsequently put in water the aqueous dispersion thereof will have a pH falling within the range of about 7 to 9.

The modification involving steps 9 and 10 is presented since under certain commercial operating conditions it may be desirable to convert the fibrous pectic acid pulp of step 6 to the desired fibrous pectate prior to drying. In step 9 the neutralization of the fibrous pectic acid constituents of the pulp may be conveniently effected by the use of sodium carbonate, or those other alkaline reagents discussed hereinabove in connection with step 8. The drying of the pulp, indicated at 10, may be accomplished by any of the well-known methods for drying materials of such nature.

The subsequent steps, 11 to 16 inclusive, are directed specifically to purification or separation of the fibrous pectic substances from their association with the cellulosic components of the pulp. In step 11, neutralization of the pectic acid constituents of the pulp resulting from step 6 is conveniently effected by the use of sodium carbonate as set forth in the specific example, or by those other alkaline reagents previously discussed in connection with step 8. Neutralization at this step may be conveniently effected by suspending the pulp in water to which the neutralizing agent is added. The dispersion of the neutralized pulp, indicated at 12, is promoted by maintaining the alkalinity of the suspension within the range of about pH 7 to 9, while the suspension is thoroughly stirred. It is understood, of course, that the expression "dispersion" as used herein is not directed to the physical distribution of the pulp particles throughout the aqueous phase, but refers to the colloidal solution of the soluble pectate in the aqueous phase. The interrelationship of the temperature, time of treatment, and pH necessary to effect satisfactory dispersion follows the general rules previously set forth in discussing the pectation in step 3.

Filtration in step 13 is satisfactorily accomplished by a plate and frame filter press, the liquor recovered from the filtration being substantially free of insoluble substances. Obviously other means of filtration may be used.

In step 14, precipitation of the liquor from step 9 may be accomplished by use of the isopropyl alcohol mentioned in the specific example. It is to be understood, of course, that other reagents which will effect the precipitation of pectic substances may be employed. Other alcohols as, for example, ethyl alcohol, methyl alcohol, propyl alcohol, etc., may be used as well as acetone. Acetone, of course, could be used, but is not considered as commercially feasible at present. The concentration of alcohol used is not particularly critical, but should not be below about 70% when equal volumes of alcohol and liquor are used in the precipitation step.

The separation of the precipitant and the drying of the precipitate called for in steps 15 and 16 may be carried out in any of the well-known manners.

While crude fibrous pectated pulps have been previously prepared and are now an article of commerce the product of this invention differs from the previously known pulps in at least two very essential characteristics. The crude fibrous pectate pulps of the prior art are not cold water soluble. In using the term "cold water soluble" it is implied that the water used for dispersion of the pulps is at room temperature or seasonable temperature, as distinguished from heated water. Furthermore, the crude fibrous pectate pulps of commerce require the use of relatively large quantities of dispersants or peptizing agents to get the pectic substances into solution and, in addition, the pulp must be boiled in water carrying these dispersants in order to effect dispersion of the pectic substances therein contained. On the other hand, crude fibrous pectate pulp prepared in accordance with the present invention is a product in which the pectic constituents thereof are not only readily soluble in water at room temperature, but there is no need for added dispersants. Also it is pointed out that the crude pectated pulp is of lighter color and greater purity and upon dispersion in water yields sols of high viscosity. It becomes immediately obvious that this product is of much greater utility than the crude fibrous pectate pulps previously manufactured, since the pectic constituents of the new product may be put into solution without the use of equipment for heating large quantities of water to a boiling temperature and without the necessity of increasing the cost of the use of these pulps by the addition of chemical dispersants. It is believed that the above-mentioned disadvantages inherent in the crude fibrous pectate pulps of commerce have hindered their widespread use in the steel, paper, and rubber industries. The product of the present process, which does not have these disadvantages, will be particularly useful in these fields.

Having thus described my invention in such full, clear, concise, and exact language as to enable others skilled in the art to make and use the same, I claim as my invention and desire to secure by Letters Patent the following:

1. A process which comprises subjecting pectous source materials to pectation to produce a fibrous pectate pulp, washing the pectated pulp to remove water-soluble constituents therefrom, leaching the washed pulp with an acid to remove metallic ions capable of forming insoluble pectates, and subsequently washing the leached pulp to remove excessive acidic reagent and soluble components therefrom.

2. A process which comprises subjecting pectous source materials to pectation at a pH above 7 to produce a fibrous pectate pulp, washing the pectated pulp to remove water-soluble constituents therefrom, leaching the washed pulp with an acid to remove metallic ions capable of forming insoluble pectates, and subsequently washing the leached pulp to remove excess acidic reagent and soluble components therefrom.

3. A process which comprises subjecting pectous source materials to pectation to produce a fibrous pectate pulp, washing the pectated pulp to remove water-soluble constituents therefrom, leaching the washed pulp with an acid to remove metallic ions capable of forming insoluble pectates, washing the leached pulp to remove excess acidic reagent and soluble components therefrom, neutralizing the washed material to within a pH range of about 6 to 8, and drying the so-treated material.

4. A process which comprises subjecting pectous source materials to pectation to produce a fibrous pectate pulp, washing the pectated pulp to remove water-soluble constituents therefrom, leaching the washed pulp with an acid to remove metallic ions capable of forming insoluble pectates, washing the leached pulp to remove excess acidic reagent and soluble components therefrom, solubilizing the pectous components thereof in an aqueous medium by neutralizing the leached pulp to within a pH range of about 6 to 8, filtering the soluble pectous components therefrom, precipitating the pectates from solution by the use of alcohol and separating the alcohol from the precipitate.

5. A process which comprises subjecting ground citrus peel to pectation with sodium carbonate at a pH above 7, washing the pectated pulp to remove water-soluble constituents therefrom, leaching the washed pulp with hydrochloric acid to remove metallic ions capable of forming insoluble pectate, and subsequently washing the leached pulp to remove excess acidic reagent and soluble components therefrom.

6. A pectous material comprising a cellulosic pulp having distributed therein fibrous pectic acid, said pulp being substantially free from metallic ions capable of forming insoluble pectates, and being dispersible in cold aqueous alkalis.

7. A fibrous pectic acid cellulosic pulp substantially free from metallic ions capable of forming insoluble pectates, said pulp being dispersible in cold aqueous alkalis.

EDWIN F. BRYANT.

REFERENCES CITED

The following references are of record in the file of this patent:

UNITED STATES PATENTS

| Number | Name | Date |
|---|---|---|
| 1,410,920 | Huber | Mar. 28, 1922 |
| 2,132,064 | Wilson | Oct. 4, 1938 |
| 2,020,572 | Platt | Nov. 12, 1935 |
| Re. 21,077 | Wilson | May 9, 1939 |